(12) United States Patent
Strizki

(10) Patent No.: US 7,806,377 B2
(45) Date of Patent: Oct. 5, 2010

(54) MODULAR SOLAR PANEL MOUNTING SYSTEM

(75) Inventor: Michael Strizki, Hopewell, NJ (US)

(73) Assignee: Renewable Energy Holdings, LLC, Hopewell, NJ (US)

( * ) Notice: Subject to any disclaimer, the term of this patent is extended or adjusted under 35 U.S.C. 154(b) by 0 days.

(21) Appl. No.: 12/391,559

(22) Filed: Feb. 24, 2009

(65) Prior Publication Data

US 2009/0302183 A1 Dec. 10, 2009

Related U.S. Application Data

(60) Provisional application No. 61/031,236, filed on Feb. 25, 2008.

(51) Int. Cl.
*F16M 11/00* (2006.01)
(52) U.S. Cl. ............... 248/200; 52/173.3; 248/309.1
(58) Field of Classification Search ............ 248/200, 248/309.1; 126/571, 623, 906; 52/173.3
See application file for complete search history.

(56) References Cited

U.S. PATENT DOCUMENTS

| | | | |
|---|---|---|---|
| 7,012,188 B2 * | 3/2006 | Erling | 136/251 |
| 7,230,819 B2 * | 6/2007 | Muchow et al. | 361/601 |
| 7,600,350 B2 * | 10/2009 | Braunstein | 52/173.3 |
| 7,634,875 B2 * | 12/2009 | Genschorek | 52/173.3 |
| 2005/0161073 A1 * | 7/2005 | Head et al. | 136/245 |
| 2008/0236571 A1 * | 10/2008 | Keshner et al. | 126/623 |
| 2009/0065046 A1 * | 3/2009 | DeNault | 136/248 |
| 2009/0293932 A1 * | 12/2009 | Augenbraun et al. | 136/244 |

OTHER PUBLICATIONS

SunLink News, vol. 1, No. 1—Eastwood Energy Corporation, 100 Larkspur Landing Circle, Suite 114, Larkspur, CA 94939-2005.
SunLink—Assembly instructions for one 4x1 panel—Eastwood Energy Corporation, 100 Larkspur Landing Circle, Suite 114, Larkspur, CA 94939-2005.
SunLink PV Module Mounting System—4X3L/10° T Product Information—Eastwood Energy Corporation, 100 Larkspur Landing Circle, Suite 114, Larkspur, CA 94939-2004.
Sun-Link(tm) offers variable tilting to maximize solar output—Eastwood Energy Corporation, 100 Larkspur Landing Circle, Suite 114, Larkspur, CA 94939-2004.
Assembly Instructions for Sunlink PV Module Mounting System—Eastwood Energy Corporation, 100 Larkspur Landing Circle, Suite 114, Larkspur, CA 94939-2006.

\* cited by examiner

*Primary Examiner*—Ramon O Ramirez
(74) *Attorney, Agent, or Firm*—Brown & Michaels, PC

(57) ABSTRACT

A mounting system for frameless solar panels having a plurality of base mounting members and a plurality mounting brackets. Each of the mounting brackets include one or more elongated bars having a center portion, a flat top plane and a flat bottom plane, wherein each of the elongated bars includes slotted holes formed on either end of the elongated bars, whereby the mounting brackets are fastened to the base mounting members through the slotted holes.

12 Claims, 5 Drawing Sheets

MODULAR SOLAR PANEL MOUNTING SYSTEM

REFERENCE TO RELATED APPLICATIONS

This application claims one or more inventions which were disclosed in Provisional Application No. 61/031,236, filed Feb. 25, 2008, entitled "MODULAR SOLAR PANEL MOUNTING SYSTEM". The benefit under 35 USC §119(e) of the United States provisional application is hereby claimed, and the aforementioned application is hereby incorporated herein by reference.

BACKGROUND OF THE INVENTION

1. Field of the Invention

This invention relates generally to a mounting system for solar panels. Specifically, the present invention relates to a modular mounting system to install frameless, thin-film solar panels on a rooftop or on the ground.

2. Description of Related Art

A solar cell or photovoltaic cell is a device that converts light energy into electrical energy by the photovoltaic effect. Traditionally the photovoltaic cells are made from crystalline silicone. Recently a new thin-film manufacturing process enables the production of photovoltaic cells using amorphous silicon at a much more reduced cost. Thin-film photovoltaic cells use less of the raw material (silicon or other light absorbers) compared to wafer based solar cells, leading to a significant price drop per kWh. These thin-film photovoltaic cells are produced as frameless, glass panels. The existing mounting systems designed to mount framed photovoltaic cells do not fit the requirements for mounting thin-film photovoltaic cells on the ground or on rooftop. Currently, thin film solar panels are manufactured with either four panels anchors (attached via adhesive), or without any such attachment. These panel anchors cannot be used to accommodate commercially available mounting rail systems to allow for frameless thin film glass panels to be installed on a slanted roof.

There exists a demand for a solar panel mounting system specifically designed for the frameless, glass paneled, thin-film photovoltaic cells that reduces the cost and labor requirement of installation and allows module manufacturers to utilize their existing UL-certified modules in conjunction in either a commercially available, certified mounting rail system, or the pan mounting system.

SUMMARY OF THE INVENTION

The present invention includes a mounting system for frameless solar panels having a plurality of base mounting members and a plurality mounting brackets. Each of the mounting brackets includes an elongated bar having a center portion, a flat top plane and a flat bottom plane, wherein each of the elongated bars includes slotted holes formed on either end of the elongated bars, whereby the mounting brackets are fastened to the base mounting members through the slotted holes.

In a first embodiment of the present invention, the base mounting members are ground mounting pans with a flat center portion having a front edge and back edge along the long axis of the center portion. Two walls extend perpendicular to the center portion, wherein the bottom edge of the two walls affix to the front and back edge of the center portion and flanges affix to the top edge of each of the two walls, wherein the flanges are parallel to each other. The center portion of the ground mounting pan is capable of receiving ballast blocks. The mounting pans are composed of metals selected from the group consisting of aluminum or galvanized steel and have dimension which include a width of about 34.0 inches and a height of about 12.8 inches.

The invention includes a plurality of second mounting brackets wherein each of the mounting brackets has one or more elongated bars having a center portion, a flat top plane and a flat bottom plane. Each of the elongated bars include slotted holes formed on either end of the elongated bars, wherein the long axis of the slotted holes of the elongated bar is perpendicular to the long axis of the elongated bar.

The mounting pans have connection inlets located in the flat center portion which align with the slotted holes of the second mounting brackets upon installation of the system.

In another embodiment, the mounting system has a base mounting member of mounting pans, wherein one side of the center portion is narrower than the other side, thereby allowing the overlapping of the narrower side of one ground mounting pan to the wider side of the center portion of a second ground mounting pan. The pan includes a wiring inlet and drainage holes and has a width of about 51.0 inches and a height of about 12.5 inches.

In another embodiment, the invention includes a process for mounting solar panels in a mounting system including the steps of attaching a first bracket to a solar panel and securing the bracket to a base mounting member. The first bracket includes one or more elongated bars having a flat top plane and a flat bottom plane, wherein each of the elongated bars has slotted holes formed on either end of the elongated bar, wherein the long axis of the slotted holes of the elongated bar is parallel to the long axis of the elongated bar.

The mounting system can be used to mount solar panels on the ground or on essentially flat rooftops by utilizing ground mounting pans as the base mounting members. This invention provides a standardized option for frameless solar panels installation resulting in lower costs, less materials used, and streamlined installations.

DETAILED DESCRIPTION OF THE INVENTION

This invention teaches modular mounting systems designed to reduce cost and labor needed to install frameless, glass paneled, thin-film solar modules on a slant-roof, flat roof, or ground-mounted solar systems. The two main elements of the system are 1) mounting brackets affixed directly to the glass thin-film solar panels, and 2) base mounting members designed to receive the brackets and hold the modules.

Figure 1:
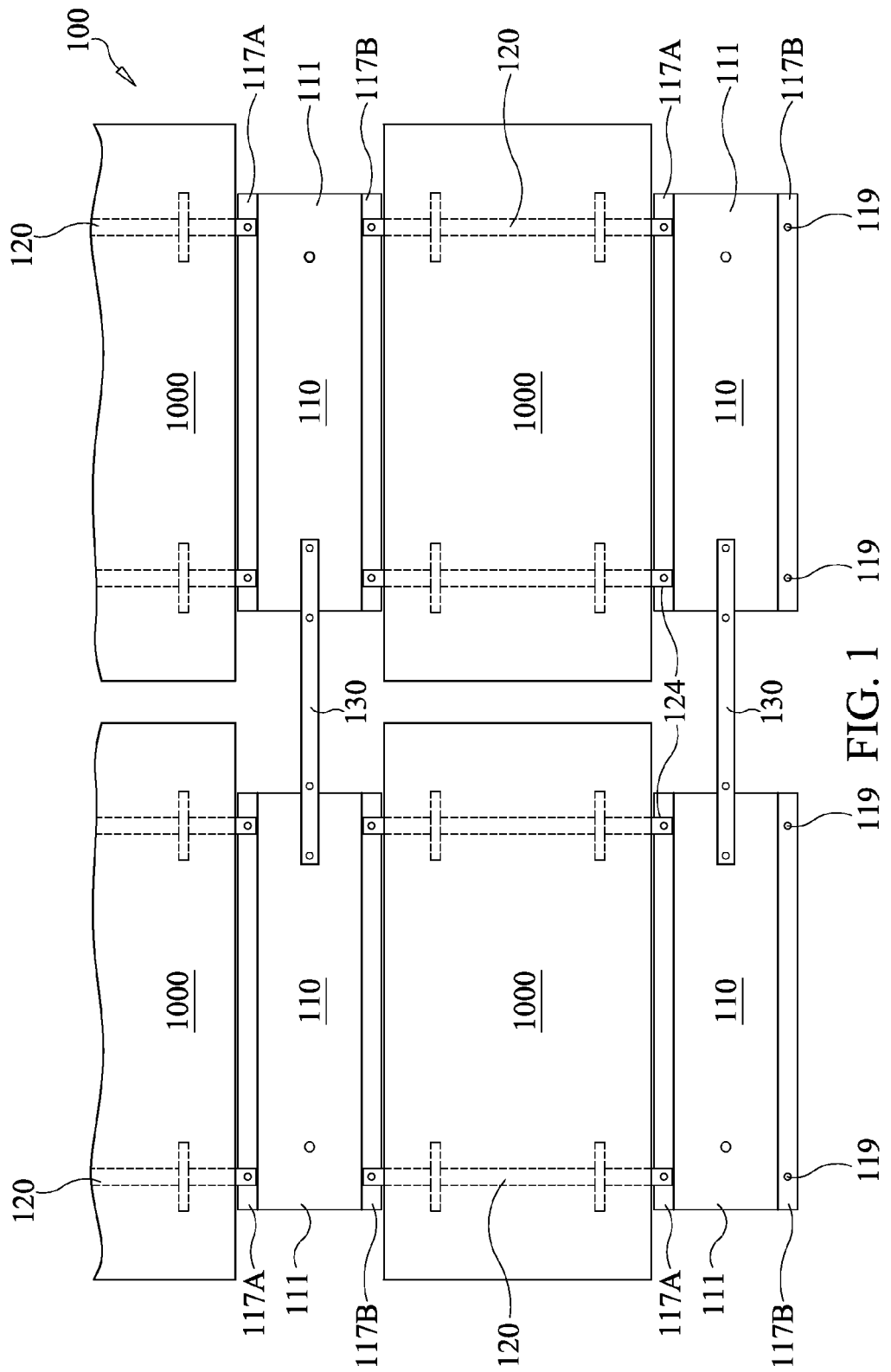
FIG. 1 is a top plan view of a first embodiment of the system.
Figure 2A:
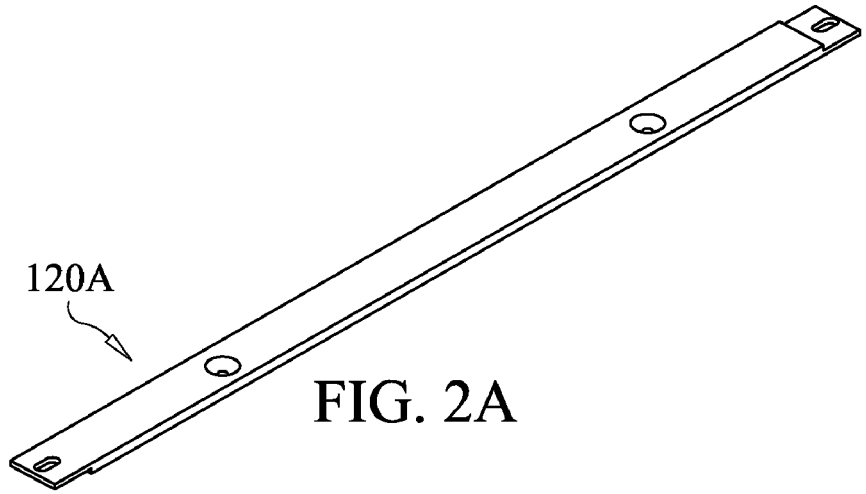
FIG. 2A is a perspective view of a modified first mounting bracket.
Figure 2B:
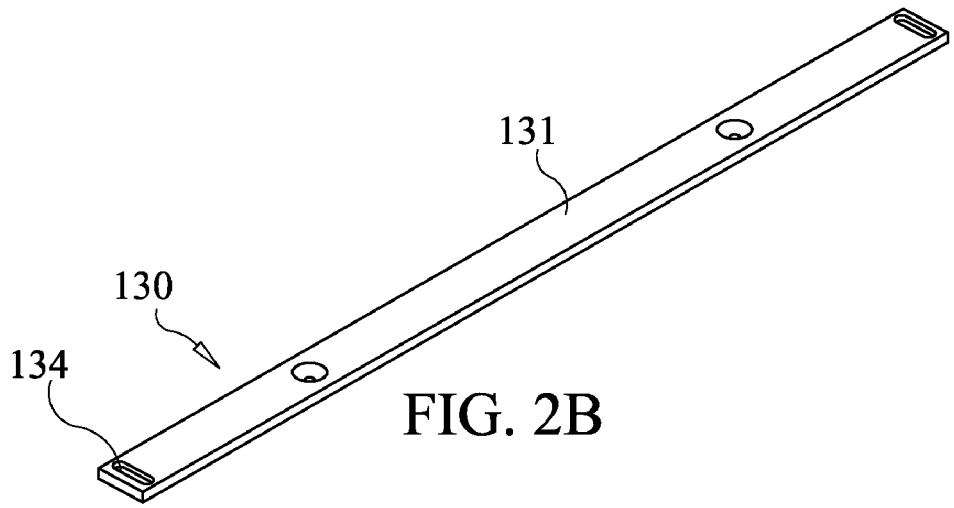
FIG. 2B is a perspective view of a second mounting bracket.
Figure 2C:
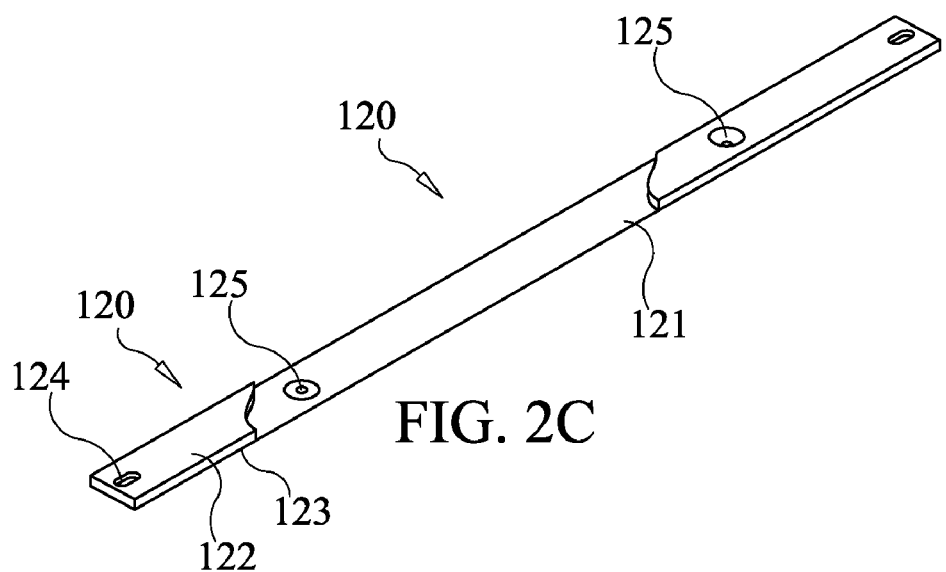
FIG. 2C is a perspective view of a first mounting bracket

Referring to FIGS. 1, 2A and 2C the first embodiment of the present invention includes a mounting system 100 for a frameless solar panel 1000 having a plurality of base mounting members 110 and a plurality mounting brackets 120, wherein each of the mounting brackets 120 comprises an elongated bar 121 having a flat top plane 122 and a flat bottom plane 123, wherein each of the elongated bars 121 have slotted holes 124 formed on either end of the elongated bar 121, whereby the mounting brackets 120 are fastened to the base mounting members 110 through the slotted holes 124 (as best illustrated in FIG. 1). The slotted holes 124 are elongated in the direction parallel to the elongated bar 121 thereby allowing limited movement in the direction of the weight caused by (the repeating pattern of mounting pan and solar panel with attached mounting brackets) of the system 100. In addition, it is within the scope of the present invention, that modified brackets 120A, as illustrated in FIG. 2A, could include notched ends so as to have a contoured fit with mounting pans.

Figure 4:
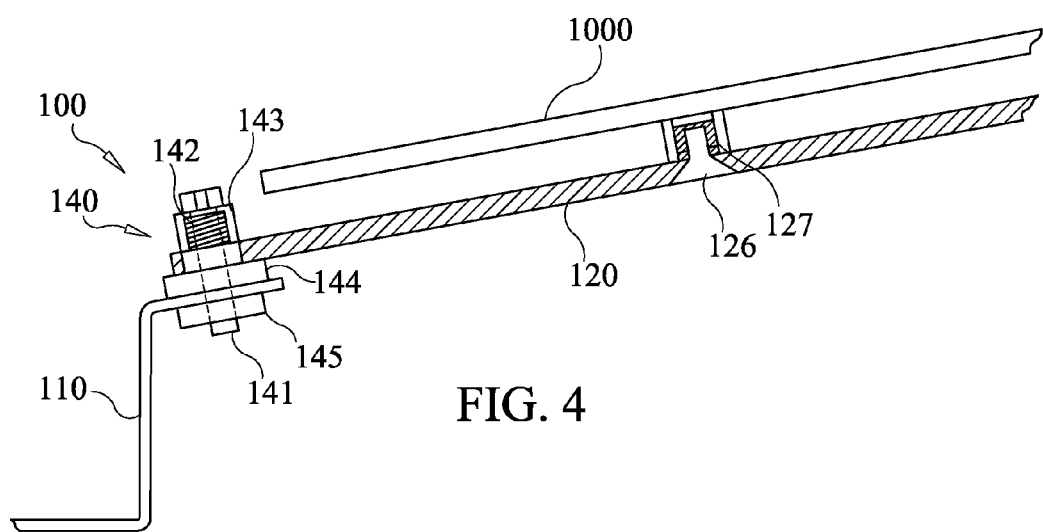
FIG. 4 is a side view of the mounting system of the invention.

The mounting brackets include panel holes 125 which are a uniform distance from the slotted holes 124 and placed so as to align with conventional panel anchors on a solar panel manufactured and commercially available. Attachment of the bracket 120 to the solar panel can be by various means including a fastener such as a screw 126 and nut 127 assembly, wherein the nut 127 is secured in the panel anchor as illustrated in FIG. 4. The brackets 120 are made of steel or aluminum and can be coated with corrosion resistant materials if necessary.

Figure 3:
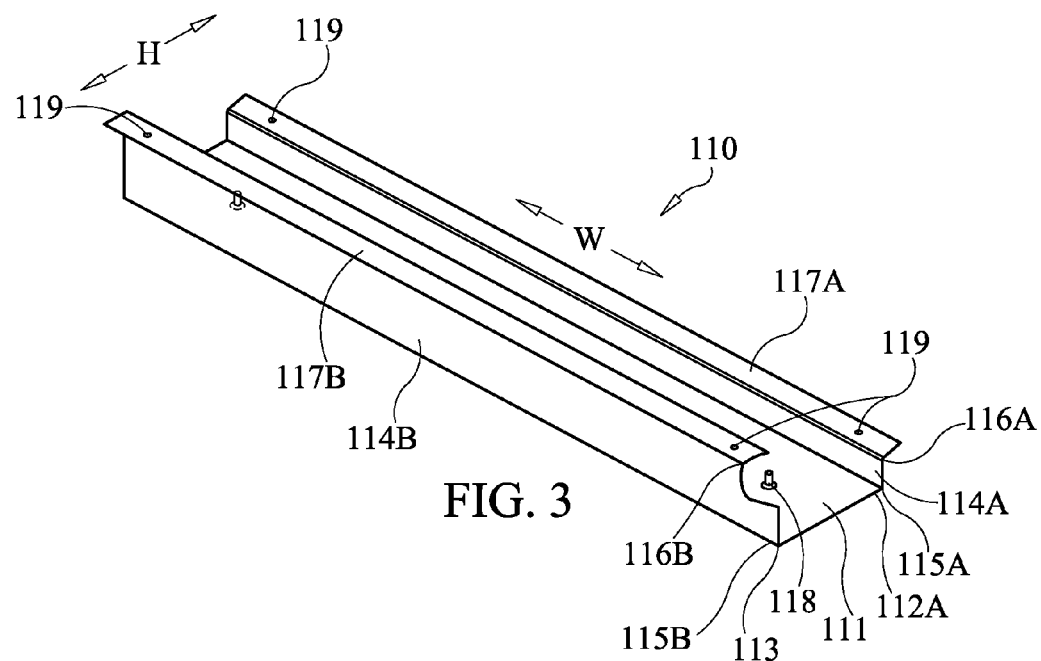
FIG. 3 is a perspective view of the ground mounting pan of the first embodiment.

Referring to FIGS. 1 and 3, for installation of glass thin-film solar panels in a ground mount system or on an essentially flat rooftop, the base mounting member can be ground mounting pans 110. The ground mounting pans 110 have a flat center portion 111 with a front edge 112 and back edge 113 along the long axis of the center portion 111. Two walls 114A, 114B extend perpendicular from the center portion 111, wherein the bottom edge 115A, 115B of each of the two walls 114A, 114B are affixed to the front 112 and back edge 113 of the center portion 111. Affixed to each top edge 116A, 116B of the each of the two walls 114A, 114B, are flanges 117A, 117B which are parallel to each other. The mounting pan 110 is designed to accommodate an attached panel 1000 in the front and/or rear, as illustrated in FIG. 1.

The ground mounting pans 110 of the present invention 100 are designed to mount any frameless solar panel 1000 as a ground mount system or as a non-penetrating roof mounting system using ballast to retain the system to the roof. The center portion 111 of the ground mounting pan 110 is capable of receiving ballast blocks (not shown) to hold the mounting pan 110 in place without the need for additional supports or attachments. The central portion 111 is configured to fit a commercially available standard building block which can be found in any mason yard.

The mounting pan in this embodiment has width (W) of about 34.0 inches and a height (H) of about 12.8 inches. The size configuration of the pans is designed to hold up to 4 concrete ballast blocks and do not require any roof penetrations to mount to the host structure. The mounting pan 110 is essentially an aluminum or steel sheet (coated or not) and are therefore significantly cheaper when compared to typical mounting systems for flameless solar panels which are typically custom designed. The pan design can be modified to accommodate different panel angles. FIGS. 1 and 4 illustrate about a 5 degree mounting but one skilled in the art would recognize this can be modified to about a 10 degree mounting by changing the height and the angle of the flanges 117A, 117B. This will change the angle of the panel 1000 and increase the distance between rows to prevent shading.

Referring to FIGS. 1 and 2B, the system 100 includes a plurality of second mounting brackets 130 which are very similar to the first mounting brackets 120 except that the long axis of the slotted holes 134 of the elongated bar 131 is perpendicular to the long axis of the elongated bar 131, thereby limiting movement of the mounting pan 110 in a direction parallel to the long axis of the second bracket 130. As best illustrated in FIGS. 1 and 3, the second mounting brackets 130 attach the mounting pans 110 together to ensure any movement of the mounting pans 110 are uniform throughout the system 100, e.g. one mounting pan can not slide away from the others causing damage to a solar panel and reducing the integrity of the system. The mounting pans 110 have connection spikes 118 located in the flat center portion 111 which align with the slotted holes 134 of the second mounting brackets 130 upon installation of the system 100. The second mounting brackets 130 connect adjacent pans and are only necessary on every other row to provide sufficient lateral stability of the overall system. The mounting pans 110 have a plurality of attachment inserts 119 on the flanges for receipt of attachments. For example, the bracket holes 124 are aligned with attachment inserts 119 for proper installation, as shown in FIG. 1.

The pans 110 can quickly connect to each bracket 120 by using push-pins, or any other type of mechanical fastener. For example, as illustrated in FIG. 4, a spring-loaded mounted hardware assembly 140 would include a bolt 141 encased in a spring 142 separated by a cup washer 143, wherein the bolt 141 would traverse the mounting pan 110 and bracket 120. A bushing 144, usually made of rubber, would separate the mounting pan 110 and the bracket 120. The assembly 140 would be secured by a nut 145 fastened to the bolt 141. This amounting hardware assembly will protect the glass modules from breakage through over tightening during installation and/or roof movement. It will be understood by those skilled in the art that variations of the fastening methods and devices could be used to attach the mounting pans 110 and the brackets 120.

In addition, this type of floating installation allows for temperature-based thermal roof expansion and contraction without stressing the modules, thus preventing breakage. In addition, the "spaced" design (wherein the pans are not in contact with each other) allows for better drainage, is easier to wire since there is a large gap between each pan 110, and is ideally suited for low wind areas and ground mounts.

Figure 7A:
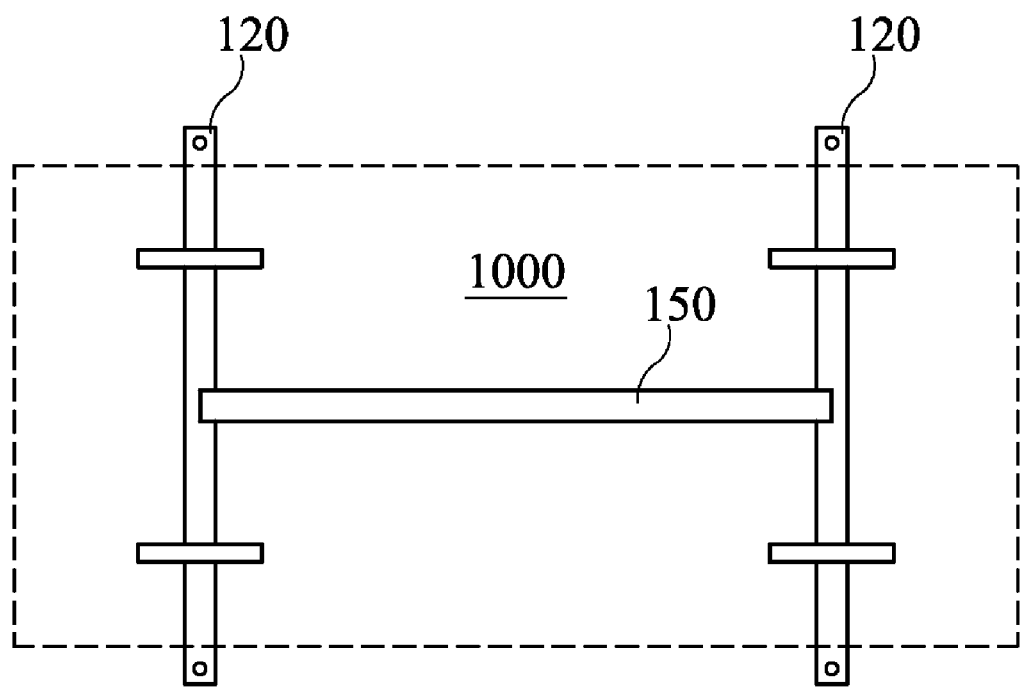
FIG. 7A is a plan view of a perpendicular bar bracket support configuration.
Figure 7B:
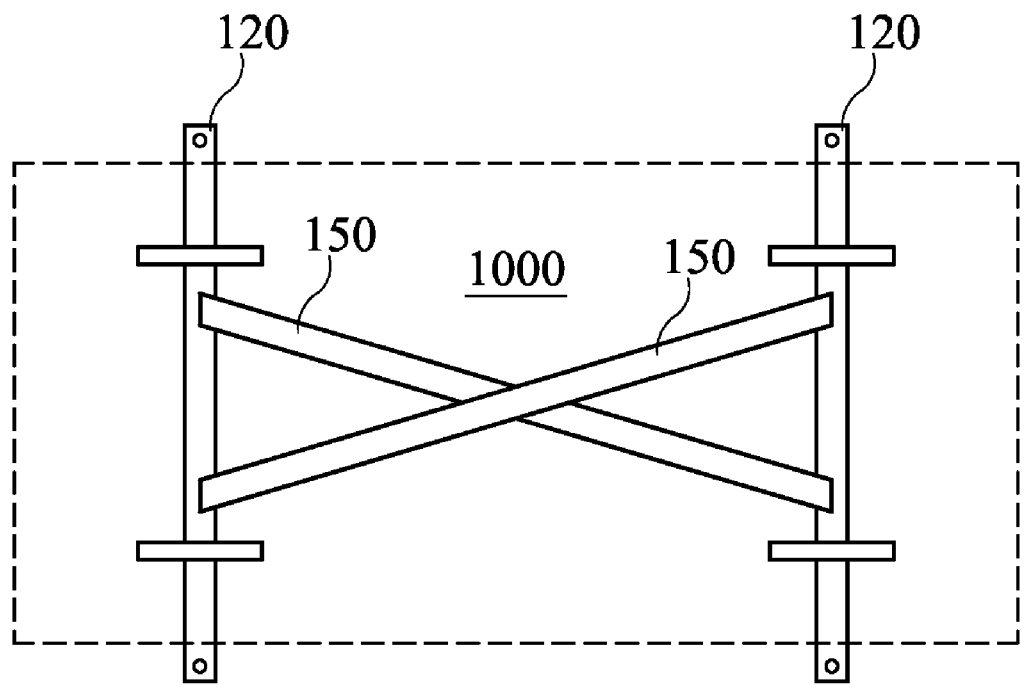
FIG. 7B is a plan view of a crossing bar bracket support configuration.

As illustrated in FIG. 1, the mounting brackets 120 are parallel to each other when attached to the solar panels 1000. As illustrated in FIG. 7A, this configuration can be supported and strengthened by a brace 150 which connects the brackets 120. The brace 150 is a bar perpendicular to the brackets 120, wherein each end of the brace 150 connects each bracket 120 attached to a solar panel 1000. As illustrated in FIG. 7B, the system could include two intersecting braces 150 wherein each intersecting brace 150 is attached to brackets 120 attached to a solar panel 1000. Attachment of the brace 150 to the brackets 120 can be by various methods, e.g. adhesive, fasteners or weld.

It is within the scope of this invention to include the four individual panel anchors as part of a one-piece mounting bracket that can simply be applied using the same adhesive as part of the thin film module manufacturing process. Thus, the mounting brackets 120 having the support configuration, as described, for example, in the previous paragraph, could be attached by a manufacture for commercial sale and distribution. Additionally, kits which would include the solar panel with attached bracket and base mounting members (including any necessary hardware, such as fasteners and the like) are within the concept of this invention. This will allow for fewer steps in the manufacturing and installation procedures, thus lowering the overall turnkey price per watt.

Additional embodiments of the invention will be described wherein like reference numbers refer to like components.

Figure 5:
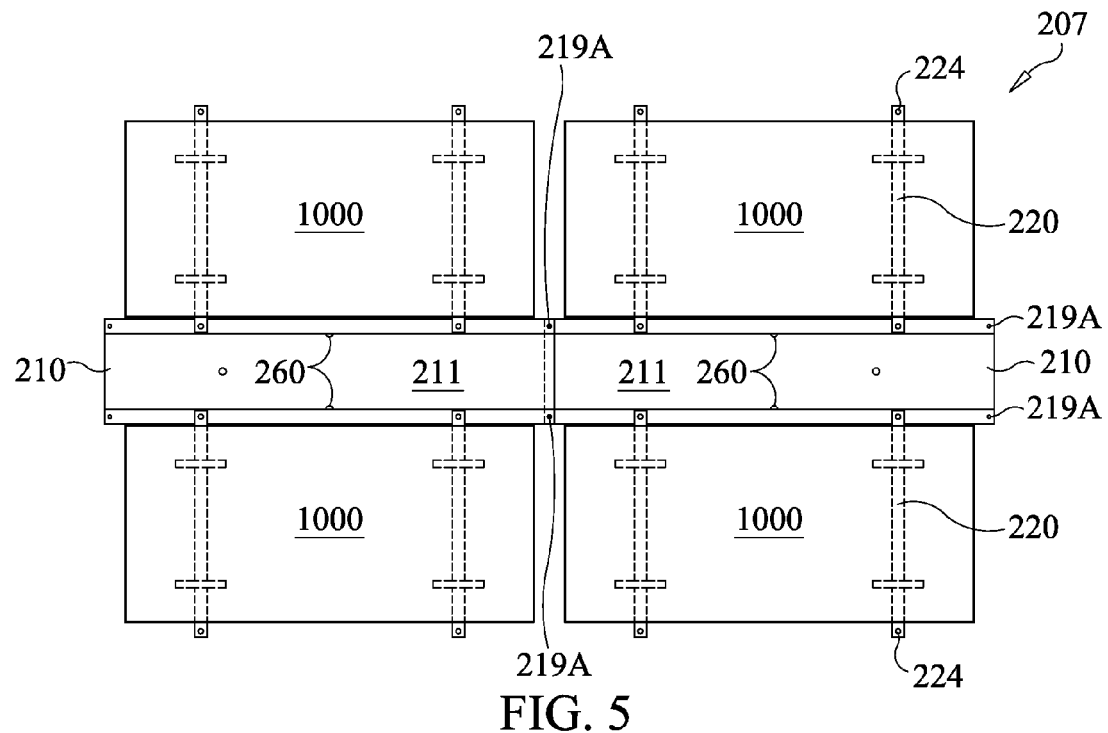
FIG. 5 is a top plan view of a another embodiment of the system.
Figure 6:
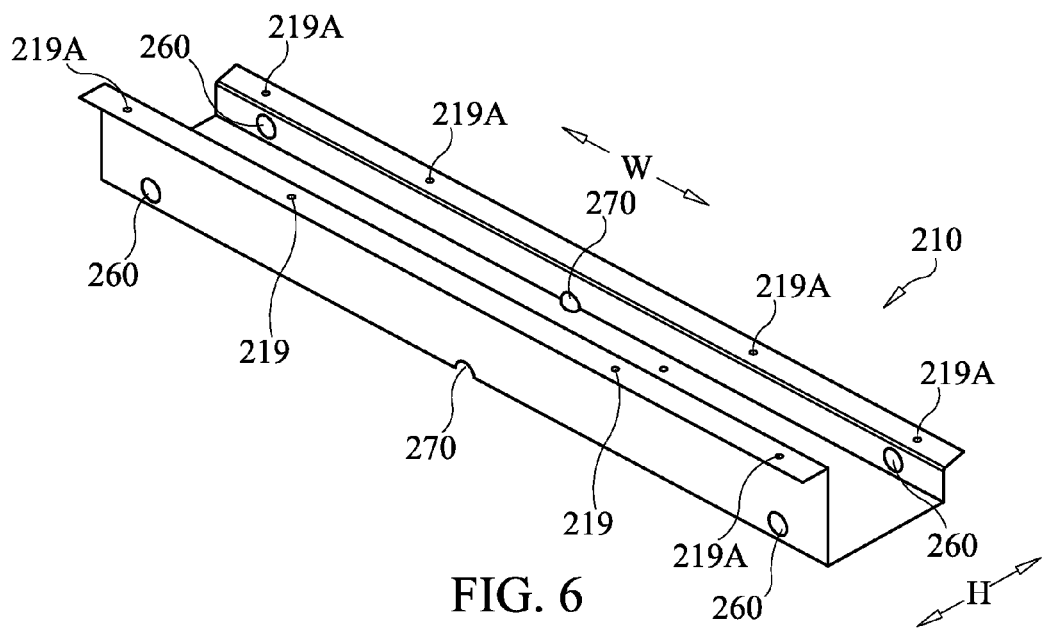
FIG. 6 is a perspective view of the ground mounting pan of the embodiment of FIG. 5.

Another embodiment of the invention is illustrated in FIGS. 5 and 6. In this embodiment, a mounting pan 210 is used wherein, when installed, it overlaps the adjacent pan 210, as illustrated in FIG. 5. Each mounting pan 210 is manufactured wherein one end of each mounting pan is slightly narrower to allow for the next mounting pan to be laid in during installation. The narrowed area approximates the outer attachment insert 219A on only one end of each mounting pan 210. As in the previous embodiment, the attachment inserts 219 on the flanges 217A, 217B are for receipt of attachments. For example, the bracket holes 224 are aligned with attachment inserts 219 for proper installation, as shown in FIG. 5.

In this embodiment, the mounting pan 210 includes wiring inlets 260 internal to the overlap area of the mounting pans 210 to allow for wiring. There are also drainage holes 270 so water will not collect in the bottom of the mounting pan 210. The extended width of the pan 210 provides benefits such as, increased structural support for the panel (forming a beam when bolted together), more wind load resistance, and limited labor and time during installation based on surface coverage. The mounting pan 210 of this embodiment is made with the same materials as in the previous embodiment but has a configuration of a width (W) of about 51.0 inches and a height (H) of about 12.5 inches.

In yet another embodiment, the invention includes a process for mounting solar panels in a mounting system having the steps of a) attaching a first bracket to a solar panel, and b) securing the bracket to a base mounting member. The first bracket includes one or more elongated bars having a flat top plane and a flat bottom plane, wherein each of the elongated bars has slotted holes formed on either end of the elongated bar, wherein the long axis of the slotted holes of the elongated bar is parallel to the long axis of the elongated bar. The process further comprises securing each base mounting member to an adjacent base mounting member by a second bracket prior to step b). The second bracket includes an elongated bar having a flat top plane and a flat bottom plane, wherein each of the elongated bars has slotted holes formed on either end of the elongated bar, wherein the long axis of the slotted holes of the elongated bar is perpendicular to the long axis of the elongated bar.

In yet another embodiment, the invention includes a process for mounting solar panels in a mounting system having the steps of a) attaching a first bracket to a solar panel, and b) securing the bracket to a base mounting member. The first bracket includes an elongate bar having a flat top plane and a flat bottom plane, wherein each elongated bar has slotted holes formed on either end of the elongated bar, wherein the long axis of the slotted holes of the elongated bar is parallel to the long axis of the elongated bar. The process further comprises overlapping each base mounting member and securing the base mounting member prior to step b).

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention. Reference herein to details of the illustrated embodiments is not intended to limit the scope of the claims, which themselves recite those features regarded as essential to the invention.

What is claimed is:

1. A mounting system for frameless solar panels, comprising:
    a plurality of base mounting members each comprising:
        a flat center portion having a front edge and back edge along the long axis of the center portion;
        two walls perpendicular to the center portion, wherein the bottom edge of the two walls are affixed to the front and back edge of the center portion; and
        a flange affixed to the top edge of the each of the two walls, wherein the flanges are parallel to each other; and
    a plurality mounting brackets;
    wherein each of the mounting brackets comprises an elongated bar having a center portion, a flat top plane and a flat bottom plane,
    wherein each of the elongated bars comprises slotted holes formed on either end of the elongated bars, whereby the mounting brackets are fastened to the base mounting members through the slotted holes.

2. The mounting system of claim 1, wherein the center portion of the ground mounting pan is capable of receiving ballast blocks.

3. The mounting system of claim 2, wherein the mounting pans are formed of a metal selected from the group consisting of aluminum or galvanized steel.

4. The mounting system of claim 3, further comprising a plurality of second mounting brackets wherein each of the mounting bracket comprises one or more elongated bars having a center portion, a flat top plane and a flat bottom plane, wherein each of the elongated bars comprises slotted holes formed on either end of the elongated bars, wherein the long axis of the slotted holes of the elongated bar is perpendicular to the long axis of the elongated bar.

5. The mounting system of claim 4, wherein the mounting pans have connection inlets located in the center portion which align with the slotted holes of the second mounting brackets upon installation of the system.

6. The mounting system of claim 5, wherein the mounting pans have a width of about 34.0 inches and a height of about 12.8 inches.

7. The mounting system of claim 3, wherein one side of the center portion is narrower than the other side, thereby allowing the overlapping of the narrower side of one ground mounting pan to the wider side of the center portion of a second ground mounting pan.

8. The mounting system of claim 7, wherein the pan includes a wiring inlet and drainage holes.

9. The mounting system of claim 8, wherein the mounting pans have a width of about 51.0 inches and a height of about 12.5 inches.

10. The mounting system of claim 3, wherein the mounting brackets further comprise:
    two elongated bars that are parallel to each other; and
    a brace, wherein the brace connects the two elongated bars.

11. The mounting system of claim 10, wherein the brace is a bar perpendicular to the elongated bars, wherein one end of the brace connects to the first elongated bar and the other end of the brace connects to the second elongated bar.

12. The mounting system of claim 10, wherein the brace comprises two bars intersecting each other.

* * * * *